United States Patent [19]

Gopikanth et al.

[11] Patent Number: 4,510,220

[45] Date of Patent: Apr. 9, 1985

[54] CELL WITH PBCL2 CATHODE

[75] Inventors: Mysore L. Gopikanth; Han C. Kuo, both of Burlington; Carl R. Schlaikjer, Winchester, all of Mass.

[73] Assignee: Duracell Inc., Bethel, Conn.

[21] Appl. No.: 509,678

[22] Filed: Jun. 30, 1983

[51] Int. Cl.$^3$ .......................... H01M 4/56; H01M 6/14
[52] U.S. Cl. .................................... 429/225; 429/194; 429/196
[58] Field of Search ........................ 429/199, 196, 225

[56] References Cited

U.S. PATENT DOCUMENTS

| | | | |
|---|---|---|---|
| 3,567,515 | 3/1971 | Maricle et al. | 429/218 X |
| 3,578,500 | 5/1971 | Maricle et al. | 429/194 X |
| 3,953,234 | 4/1976 | Hoffmann | 429/199 |
| 3,989,543 | 11/1976 | Krasnow | 429/194 X |

Primary Examiner—Brian E. Hearn
Assistant Examiner—Stephen J. Kalafut
Attorney, Agent, or Firm—Ronald S. Cornell; Israel Nissenbaum

[57] ABSTRACT

A non-aqueous electrochemical cell having an alkali or alkaline earth metal anode, an inorganic electrolyte comprised of an electrolyte salt and sulfur dioxide and a cathode comprised of $PbCl_2$.

12 Claims, No Drawings

CELL WITH PBCL$_2$ CATHODE

This invention relates to non-aqueous sulfur dioxide containing electrochemical cells and more particularly to such cells containing inorganic sulfur dioxide electrolytes.

It has recently been discovered that a factor involved in making viable rechargeable cells has been the elimination of the normally requisite organic cosolvents from cells containing sulfur dioxide (SO$_2$). The organic cosolvents as well as most other organic materials tend to be involved in generally irreversible reactions whereas ideally rechargeable cells require substantially complete reversibility of the components. However, such elimination of organic cosolvents has necessitated the utilization of electrolyte salts which are both soluble in the SO$_2$ alone (a generally poor solvent) and which provide a utilizable conductive electrolyte solution. An additional factor is the very high cost of some of the salts which may be used in this respect. Salts such as tetrachloroaluminates, tetrachlorogallates, tetrachloroindates as well as clovoborates of the alkali or alkaline earth metals were found to be useful in SO$_2$ alone (clovoborates are, however, very expensive). In such cells it is feasible to effectively utilize the SO$_2$ as only a solvent in the cell by using a solid cathode active material. However, not all solid cathode active materials provide a cell capacity which compares favorably with the capacity of a cell having the SO$_2$ as the cathode active material. In fact it has been nearly impossible to predict with any certainty which cathode active materials are of utility in inorganic SO$_2$ cell environments. Thus for example, different halides of the same metal, though normally equated in terms of function, have been shown to have markedly different properties particularly in the inorganic SO$_2$ cell environment.

It is an object of the present invention to provide a cathode active material for use in a non-aqueous SO$_2$ containing cell, particularly in an inorganic SO$_2$ containing cell which provides a high cell capacity.

This and other objects, features and advantages of the present invention will become more evident from the following discussion.

Generally the present invention comprises an electrochemical cell having an alkali or alkaline earth metal anode, preferably lithium, including mixtures and alloys thereof, an electrolyte comprised of SO$_2$ and an electrolyte salt soluble in SO$_2$, and a cathode comprised of PbCl$_2$. The electrolyte is preferably inorganic for rechargeable cell purposes.

The PbCl$_2$ has been discovered to be a useful cathode material.

The PbCl$_2$ cathode active material is preferably admixed with a conductive material such as graphite or carbon black in amounts ranging from 10-30% by weight thereof and a binder such as polytetrafluoroethylene (PTFE) in amounts between about 5-15%.

The electrolyte salts useful in the present invention include alkali and alkaline earth metal halide salts of aluminum, tantalum, niobium, antimony, gallium, indium and clovoborates which are insoluble in SO$_2$, particularly those having the anions AlCl$_4^-$, TaCl$_6^-$, NbCl$_6^-$, SbCl$_6^-$, SbCl$_6^{-3}$, GaCl$_4^-$, InCl$_4^-$, B$_{10}$Cl$_{10}^{-2}$ and B$_{12}$Cl$_{12}^{-2}$. The salts utilized by dissolving them in the SO$_2$ in low concentration; i.e., about 1 molar, or, as described in copending application Ser. No. 405,980, they may be present in high concentrations with SO$_2$ in a mole equivalent ratio no greater than 1:7. Preferably, the SO$_2$ electrolyte is inorganic.

In order to more fully illustrate the present invention the following examples including comparisons with non-operable materials are presented. It is understood that such examples are for illustrative purposes and that details contained therein are not to be construed as being limitations on the present invention. Unless otherwise indicated all parts are parts by weight.

EXAMPLE 1

A cell is made with about 20 gms of a LiAlCl$_4$·3SO$_2$ (mole equivalent ratio) electrolyte, two lithium electrodes with each having a copper foil substrate and having the dimensions 2.5×4.1×0.05 cm and a 1.7 gm cathode between the lithium electrodes comprised of 80% PbCl$_2$, 12% carbon black (Ketjenblack EC from Noury Chemical Corp.) and 8% PTFE on a nickel grid. The cathode has the dimensions 2.5×4.1×0.13 cm and is separated from the lithium electrodes by non-woven glass separators. The cell is discharged at 20 mA and provides a capacity of 360 mAhr to a 1 volt cutoff and an OCV of 3.1 volts. The obtained capacity is about 276% of the theoretical capacity of PbCl$_2$.

EXAMPLE 2

A cell is made as in Example 1 but a 1M LiGaCl$_4$ in SO$_2$ electrolyte. The obtained OCV is 3 and at a 20 mA discharge rate provides a capacity of 200 mAhrs to a 1 volt cutoff. The obtained capacity is about 153% of the theoretical capacity of PbCl$_2$.

It is understood that the above examples are for illustrative purposes and that the present invention is not to be limited to the specifics contained therein. Changes including those involved in cell construction, components and ratios may be made without departing from the scope of the present invention as defined by the following claims.

What is claimed is:

1. A non-aqueous, electrochemical cell comprising an anode comprised of an alkali or alkaline earth metal and an inorganic electrolyte comprised of SO$_2$ with an electrolyte salt dissolved therein, characterized in that said cell contains an active cathode comprised predominantly of PbCl$_2$ admixed with, from 10-30% by weight of said cathode, a conductive carbon material.

2. The cell of claim 1 wherein said electrolyte salt is selected from the group consisting of alkali or alkaline earth metal clovoborates and alkali and alkaline earth metal halide salts containing gallium, indium, aluminum, tantalum, niobium, and antimony.

3. The cell of claim 2 wherein said electrolyte salts are lithium salts.

4. The cell of claim 1 wherein said anode is comprised of lithium.

5. The cell of claim 1 wherein said electrolyte salt is selected from the group consisting of LiAlCl$_4$ and LiGaCl$_4$.

6. The cell of claim 1 wherein said salt is LiAlCl$_4$.

7. The cell of claim 6 wherein the mole equivalent ratio of LiAlCl$_4$ to SO$_2$ is no greater than 1:7.

8. A non-aqueous, electrochemical cell comprising a lithium anode and an inorganic electrolyte comprised of SO$_2$ and LiAlCl$_4$, characterized in that said cell contains an active cathode comprised predominantly of PbCl$_2$ admixed with, from 10-30% by weight of said cathode, a conductive carbon material.

9. The cell of claim 8 wherein the mole equivalent ratio of $LiAlCl_4$ to $SO_4$ does not exceed 1:7.

10. A non-aqueous, electrochemical cell comprising a lithium anode and an inorganic electrolyte comprised predominantly of $SO_2$ and $LiGaCl_4$, characterized in that said cell contains an active cathode comprised of $PbCl_2$ admixed with, from 10–30% by weight of said cathode, a conductive carbon material.

11. A non-aqueous, electrochemical cell comprising an anode comprised of an alkali or alkaline earth metal and an electrolyte comprised of $SO_2$ with an electrolyte salt dissolved therein, characterized in that said cell contains an active cathode comprised predominantly of $PbCl_2$ admixed with, from 10–30% by weight of said cathode, a conductive carbon material.

12. The cell of claim 11 wherein said electrolyte salts are lithium salts.

* * * * *